Jan. 28, 1941.   L. H. SCHMOHL ET AL   2,229,903
METERING VALVE
Filed Feb. 4, 1939
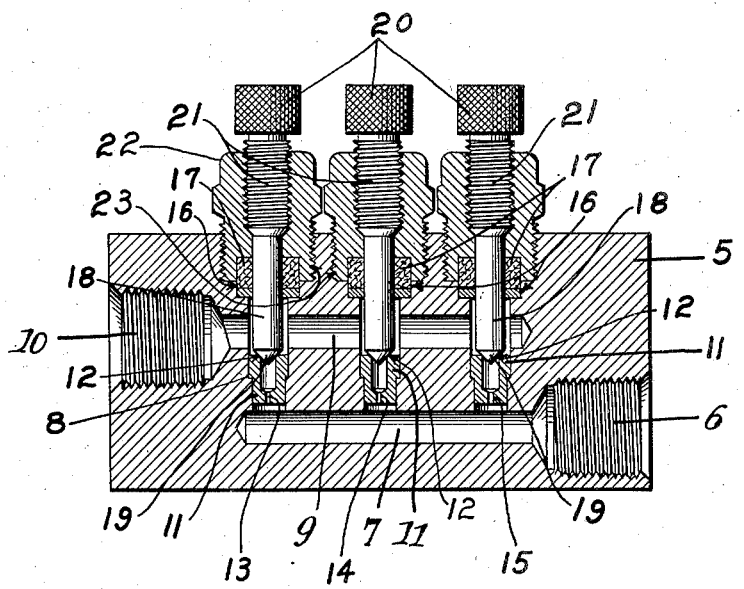
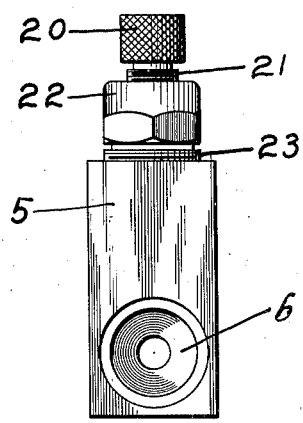
Inventors
Leland H. Schmohl,
Bertil H. T. Lindquist,
By Mason & Porter
Attorneys Patented Jan. 28, 1941

2,229,903

UNITED STATES PATENT OFFICE 2,229,903

METERING VALVE

Leland H. Schmohl and Bertil H. T. Lindquist, Cleveland, Ohio, assignors to Arthur L. Parker, Cleveland, Ohio Application February 4, 1939, Serial No. 254,696

1 Claim. (Cl. 277—57)

The invention relates generally to valve structures and has for an object to provide a novel valve structure having an inlet and an outlet and novel, multiple, flow controlling equipments intervening the inlet and the outlet and selectively effective for controlling the rate of flow through said outlet.

Another object of the invention is to provide a valve structure of the character stated in which the flow controlling equipments include flow controlling orifices of different diameters and means for rendering them selectively effective, individually or in selected combinations, so as to control the rate of flow through the outlet.

In its more detailed nature, the invention resides in the provision of a valve structure including a block or casing having an inlet and a receiving chamber or header communicating therewith, an outlet and a flow chamber or header communicating therewith, cross ports through which communication is had between the chambers or headers through flow ducts or orifices of varied diameters, and movable valve elements for selectively opening or closing and rendering effective or ineffective said ducts or orifices, individually or in selected combinations, so as to control the rate of flow through the outlet.

With the above and other objects in view that will hereinafter appear, the nature of the invention will be more clearly understood by following the detailed description, the appended claim and the several views illustrated in the accompanying drawing.

In the drawing:

Figure 1 is a vertical longitudinal sectional view of a valve structure embodying the invention.

Figure 2 is a right end elevation.

In the drawing, we have illustrated one practical embodiment of the invention in which is included a valve block or casing 5 having an inlet port 6 leading into a receiving chamber or header 7 and which communicates through cross bores or ports 8 with a flow chamber or header 9 communicating with an outlet or discharge port 10.

Each cross bore or port 8 has a valve plug 11 fitted therein and each such plug includes a coniform seat 12 and a flow controlling bore. In this particular illustration, three such cross ports and valve plugs are disclosed, but it is to be understood that this number may be varied to suit the demands of particular installations. In the particular example of practical embodiment herein shown, one bore, 13, may be considered as having a diameter of .002", another, 14, a diameter of .003", and the third, 15, as having a diameter of .004". This is merely an illustrative arrangement and it is to be understood that the individual bores have different diameters so that they can be rendered selectively effective, individually, or in selected combinations, for controlling the rate of flow through the outlet 10.

Each cross bore 8 is counterbored as at 16 to receive any suitable packing equipment generally designated 17 for suitably sealing a valve stem 18 cooperating with the particular one of the valve orifices 13, 14 or 15.

Each valve member 18 includes a conical end 19 for seating on the particular plug seat 12, and has a knurled head 20 by which it can be threadably adjusted as at 21 in the particular individual mounting nut 22, said mounting nuts being threaded into counterbores 23 formed in the valve block or casing 5.

Assuming all valves to be closed as shown in Figure 1, by properly manipulating the particular valve member 18 to fully open the orifice 13, the rate of flow through the valve outlet 10 will be directly dependent upon the area of the orifice 13. By similarly opening either of the orifices 14 or 15 while the others are closed a different rate of flow is obtained which is dependent upon the area of either of said orifice 14 or 15. By opening the orifices 13, 14 and 15 in pairs it is possible to obtain three additional different rates of flow dependent upon the combined areas of the orifices 14, 14, 13, 15 or 14, 15 respectively. By opening all three orifices the rate of flow would depend upon the combined areas of all three orifices.

Thus through the use of the three orifices 13, 14 and 15, each of different size, it is possible to obtain seven different rates of flow through the valve outlet 10. It will be obvious that by adding valve units the amount of combination controls obtainable can be increased at will. For example, by adding a fourth control orifice of individual diameter, it is possible to obtain fifteen different rates of flow.

We claim:

A valve structure including a body having an inlet and an outlet, a longitudinal receiving header bore communicating with the inlet, a longitudinal flow header bore communicating with the outlet and disposed parallel to the receiving header bore, a plurality of cross bores communicating between the headers, a seated valve plug in each cross bore, said plugs having at the ends thereof adjacent one of the headers, flow orifices therethrough of different diameters, and at the other ends of said plugs valve seats of substantially the same dimensions, said body having a counter-bore axially aligned with each cross bore, and a valve member adjustably mounted in each counter-bore and adapted to cooperate with the valve seat on the valve plug for selectively opening and closing and rendering effective or ineffective said flow orifices individually or in selected combinations so as to control the rate of flow through the outlet, said valve members being similarly dimensioned and interchangeable.

LELAND H. SCHMOHL.
BERTIL H. T. LINDQUIST.